United States Patent
Arora (10) Patent No.: US 11,782,927 B2
(45) Date of Patent: Oct. 10, 2023

(54) ELECTRONIC SYSTEM FOR DYNAMICALLY PROPAGATING DATA FROM A DATABASE TO A CACHE

(71) Applicant: BANK OF AMERICA CORPORATION, Charlotte, NC (US)

(72) Inventor: Saurabh Arora, Haryana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 195 days.

(21) Appl. No.: 17/386,781

(22) Filed: Jul. 28, 2021

(65) Prior Publication Data

US 2023/0029916 A1    Feb. 2, 2023

(51) Int. Cl.
*G06F 12/00* (2006.01)
*G06F 16/00* (2019.01)
*G06F 16/2455* (2019.01)
*G06F 11/14* (2006.01)
*G06F 16/23* (2019.01)

(52) U.S. Cl.
CPC .... *G06F 16/24552* (2019.01); *G06F 11/1474* (2013.01); *G06F 16/2358* (2019.01)

(58) Field of Classification Search
None
See application file for complete search history.

(56) References Cited

U.S. PATENT DOCUMENTS

| | | | |
|---|---|---|---|
| 5,426,747 A | 6/1995 | Weinreb et al. | |
| 5,649,139 A | 7/1997 | Weinreb et al. | |
| 6,199,141 B1 | 3/2001 | Weinreb et al. | |
| 6,594,751 B1 | 7/2003 | Leivent | |
| 11,361,330 B2 | 6/2022 | Cantley et al. | |
| 2016/0378820 A1* | 12/2016 | Marcotte | G06F 16/172 707/703 |
| 2017/0075965 A1* | 3/2017 | Liu | G06F 16/2386 |
| 2017/0351584 A1* | 12/2017 | Griffith | G06F 16/2358 |
| 2020/0241849 A1 | 7/2020 | Marthala et al. | |
| 2021/0110359 A1 | 4/2021 | Outlaw et al. | |
| 2021/0182838 A1 | 6/2021 | Khare et al. | |
| 2022/0276919 A1 | 9/2022 | Kavali et al. | |
| 2023/0029916 A1 | 2/2023 | Arora | |

* cited by examiner

*Primary Examiner* — Tuan A Pham
(74) *Attorney, Agent, or Firm* — Moore & Van Allen PLLC; R. W. McCord Rayburn (57) ABSTRACT

Systems, computer program products, and methods are described herein for dynamically propagating data from a database to a cache. The present invention may be configured to receive metadata associated with updates to data records of a database, obtain, from the database and based on the metadata, the data records that have been updated, and provide the data records that have been updated to a cache. The present invention may be configured to receive, from applications, calls for the data records, obtain, from the cache and based on receiving the calls, the data records, and provide, to the applications, the data records. In some embodiments, the present invention may be configured to monitor the database and generate the metadata associated with the updates to the data records.

20 Claims, 5 Drawing Sheets

ELECTRONIC SYSTEM FOR
DYNAMICALLY PROPAGATING DATA
FROM A DATABASE TO A CACHE

FIELD OF THE INVENTION

The present invention embraces an electronic system for dynamically propagating data from a database to a cache.

BACKGROUND

A cache is a hardware and/or software component that may store data for future requests for the data. A cache may store data that is a copy of data stored elsewhere or a result of a computation performed by an application, a system, and/or the like and may provide the data in response to a request. A cache may temporarily store data for a period of time, after responding to a number of requests, and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for dynamically propagating data from a database to a cache. The system may include at least one non-transitory storage device and at least one processing device coupled to the at least one non-transitory storage device, where the at least one processing device may be configured to receive metadata associated with updates to data records of a database, obtain, from the database and based on the metadata, the data records that have been updated, and provide the data records that have been updated to a cache. The at least one processing device may be configured to receive, from applications, calls for the data records, obtain, from the cache and based on receiving the calls, the data records, and provide, to the applications, the data records.

In some embodiments, the at least one processing device may be configured to monitor the database and generate the metadata associated with the updates to the data records.

In some embodiments, the at least one processing device may be configured to generate, based on the metadata, a log including the updates to the data records and transactions of the data records from the database to the cache, monitor the log to identify, from the transactions, failed transactions, obtain, from the database, based on the metadata, and based on identifying the failed transactions, data records associated with the failed transactions, and provide the data records associated with the failed transactions to the cache.

In some embodiments, the at least one processing device may be configured to determine, based on the metadata, a cache architecture and, when providing the data records that have been updated to the cache, provide the data records that have been updated to the cache based on the cache architecture.

In some embodiments, the cache may include a plurality of caches, and the at least one processing device may be configured to determine, based on the metadata, a cache architecture for storing the data records in the plurality of caches and provide, based on the cache architecture, the data records to the plurality of caches.

In some embodiments, the database may include a plurality of databases, the cache may include a plurality of caches, and the at least one processing device may be configured to determine, based on the metadata, a cache architecture for storing the data records in the plurality of caches and provide, based on the cache architecture, the data records to the plurality of caches.

In some embodiments, the at least one processing device may be configured to maintain the data records in the cache until receiving other metadata associated with other updates to the data records.

In some embodiments, the at least one processing device may be configured to receive additional metadata associated with other updates to the data records, obtain, from the database and based on the additional metadata, the data records that have been further updated, delete the data records that have been updated from the cache, and provide the data records that have been further updated to the cache.

In some embodiments, the metadata may include, for each data record of the data records that have been updated, an indication of an action taken with respect to the data record, a content identifier of the data record, and a type of content of the data record.

In some embodiments, the cache may include an in-memory cache, a distributed cache, and/or the like.

In some embodiments, the at least one processing device may be configured to obtain the data records that have been updated and provide the data records that have been updated to the cache in real-time based on receiving the metadata.

In some embodiments, the at least one processing device may be configured to receive calls for the data records from a plurality of types of applications and provide the data records to the plurality of types of applications.

In another aspect, the present invention embraces a computer program product for dynamically propagating data from a database to a cache. The computer program product may include a non-transitory computer-readable medium including code causing a first apparatus to receive metadata associated with updates to data records of a database, obtain, from the database and based on the metadata, the data records that have been updated, and provide the data records that have been updated to a cache. The computer program product may include a non-transitory computer-readable medium including code causing the first apparatus to receive, from applications, calls for the data records, obtain, from the cache and based on receiving the calls, the data records, and provide, to the applications, the data records.

In some embodiments, the non-transitory computer-readable medium may include code causing the first apparatus to monitor the database and generate the metadata associated with the updates to the data records.

In some embodiments, the non-transitory computer-readable medium may include code causing the first apparatus to generate, based on the metadata, a log including the updates to the data records and transactions of the data records from the database to the cache, monitor the log to identify, from the transactions, failed transactions, obtain, from the database, based on the metadata, and based on identifying the failed transactions, data records associated with the failed transactions, and provide the data records associated with the failed transactions to the cache.

In some embodiments, the non-transitory computer-readable medium may include code causing the first apparatus to determine, based on the metadata, a cache architecture and, when providing the data records that have been updated to the cache, provide the data records that have been updated to the cache based on the cache architecture.

In some embodiments, the cache may include a plurality of caches, and the non-transitory computer-readable medium may include code causing the first apparatus to determine, based on the metadata, a cache architecture for storing the data records in the plurality of caches and provide, based on the cache architecture, the data records to the plurality of caches.

In some embodiments, the database may include a plurality of databases, the cache may include a plurality of caches, and the non-transitory computer-readable medium may include code causing the first apparatus to determine, based on the metadata, a cache architecture for storing the data records in the plurality of caches and provide, based on the cache architecture, the data records to the plurality of caches.

In some embodiments, the non-transitory computer-readable medium may include code causing the first apparatus to maintain the data records in the cache until receiving other metadata associated with other updates to the data records.

In yet another aspect, a method for dynamically propagating data from a database to a cache is presented. The method may include receiving metadata associated with updates to data records of a database, obtaining, from the database and based on the metadata, the data records that have been updated, and providing the data records that have been updated to a cache. The method may include receiving, from applications, calls for the data records, obtaining, from the cache and based on receiving the calls, the data records, and providing, to the applications, the data records.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, a cache may be a hardware and/or software component that may store data for future requests for the data. A cache may store data that is a copy of data stored elsewhere or a result of a computation performed by an application, a system, and/or the like and may provide the data in response to a request. A cache may temporarily store data for a period of time, after responding to a number of requests, and/or the like.

Systems may use a cache to store data that is a copy of data stored in a database such that applications may request the data from the cache, rather than the database. A cache typically responds to an application request faster than a database would respond, which conserves computing resources and/or network resources and reduces latency within the system. However, because a cache stores a copy of data as the data existed in the database at the time the cache obtained the data from the database, when the data is updated in the database after the cache obtains the data, the data stored in the cache may be inaccurate and/or out-of-date as compared to the data in the database. Thus, when applications request the data from the cache, the cache responds with the inaccurate and/or out-of-date data, which consumes significant resources (e.g., financial resources, computing resources, network resources, and/or the like) associated with inaccurate calculations, actions, processing, and/or the like performed by the applications based on the inaccurate and/or out-of-date data.

In an effort to remedy such issues, a cache may, as noted, store the data for a predefined period of time, for a predefined number of requests, and/or the like, and may refresh or obtain the data from the database again after the predefined time period, after the predefined number of requests, and/or the like. In this way, the cache may at least mitigate issues associated with inaccurate and/or out-of-date data in the cache.

However, the predefined time period may be too long or too short depending on how frequently the data in the database is updated. For example, if the data has not been updated in the database since the cache obtained the data and the predefined time period and/or number of requests has been met (e.g., the time period is too short), by deleting the data from the cache and requesting the data again from the database, the cache unnecessarily increases the number of requests to the database. Thus, by storing the data in the cache for a time period that is too short, the system unnecessarily consumes resources (e.g., financial resources, computing resources, network resources, and/or the like) associated with maintaining the cache and may increase latency, thereby reducing performance of the system. As another example, if the data has been updated in the database since the cache obtained the data and the predefined time period and/or number of requests has not been met (e.g., the time period is too long), the cache may, when applications request data from the cache, respond with the inaccurate and/or out-of-date data, and thus fail to mitigate issues associated with inaccurate and/or out-of-date data in the cache.

In another effort to remedy the issues associated with inaccurate and/or out-of-date data in the cache, a system may restart a virtual machine associated with the cache and/or applications accessing the cache. However, restarting the virtual machine may generate issues and/or reduce performance within a production environment and consumes resources (e.g., financial resources, computing resources, network resources, and/or the like) associated with restarting the virtual machine, mitigating and/or resolving the issues generated in the production environment.

Within a system architecture, each application implements its own caching logic, thereby reducing consistency and further complicating the previously described issues associated with inaccurate and/or out-of-date data in the cache. Furthermore, when such issues arise, the inconsistency in caching logic between the applications causes delays when the issues are triaged, which further consumes resources (e.g., financial resources, computing resources, network resources, and/or the like). Additionally, when an application's cache is switched from an in-memory cache to a distributed cache, the caching logic must be re-written to connect to the distributed cache, which further consumes resources (e.g., financial resources, computing resources, network resources, and/or the like).

Some embodiments described herein provide a system, a computer program product, and/or a method for dynamically propagating data from a database to a cache. For example, a system (e.g., an electronic system for dynamically propagating data from a database to a cache and/or the like) may be configured to receive metadata associated with updates to data records of a database, obtain, from the database and based on the metadata, the data records that have been updated, and provide the data records that have been updated to a cache. By obtaining only the data records that have been updated from the database, the system may reduce the number of requests to the database, mitigate and/or eliminate issues associated with inaccurate and/or out-of-date data in the cache, thereby conserving significant resources (e.g., financial resources, computing resources, network resources, and/or the like) that would otherwise be consumed by too short or too long predefined periods of time for refreshing the cache, too low or too high predefined numbers of requests before refreshing the cache, refreshing the virtual machine, and/or the like.

As another example, a system (e.g., an electronic system for dynamically propagating data from a database to a cache and/or the like) may be configured to receive, from applications, calls for the data records, obtain, from the cache and based on receiving the calls, the data records, and provide, to the applications, the data records. By receiving the calls from the applications, obtaining the data from the cache, and providing the data to the applications, the system may mitigate and/or eliminate the previously described issues with respect to each application implementing its own caching logic and conserve resources (e.g., financial resources, computing resources, network resources, and/or the like) that would otherwise be consumed by delays when issues are triaged, when an application's cache is switched from in-memory to a distributed cache, and/or the like.

For example, a system may include one or more listener applications to handle database events (e.g., deletions, insertions, changes, and/or the like to the data) and collect metadata of changes made to the database. The system may also include a cache propagator application, and the listener applications may call the cache propagator application to create, update, modify, and/or the like cache entries (e.g., at corresponding virtual machines). In some embodiments, the system may dynamically determine the cache architecture in use and update data to a respective cache tier. Additionally, or alternatively, the system may include an application (e.g., the cache propagator application) to handle cache events (e.g., ehcache events, distributed cache events, and/or the like) for new application components. In some embodiments, the system may include an architecture that easily integrates with existing and/or new components. Additionally, or alternatively, the cache propagator application may be migrated from an in-memory cache to a distributed cache with minimal and/or no changes to application components.

In some embodiments, the system may include a combination of a listener application and one or more cache propagator applications to move databases changes to a cache tier in real time. Additionally, or alternatively, the listener application and the cache propagator applications may be pluggable applications and may be used with a plurality of application components and facilitate faster development with consistent design that apply common cache design patterns on application components using the cache propagator applications. In some embodiments, the system may migrate application components from one cache design to another with minimal and/or no changes to application code and may handle cache access requests from various client applications.

In some embodiments, the system may be configured to dynamically update data stored in a cache in response to updates made to the data in a database so that application requests made on the cache return the updated data rather than out-of-date data. In doing so, the system prevents problems that may arise when applications use out-of-date data and reduces the number of calls made to the database, which improves latency. To do this, the system receives metadata from event handlers on the database, where the metadata includes information regarding updates made to the database (e.g., insertions, deletions, modifications, etc.). The system may use a listener application to process the metadata and generate a log of each update made to the database. The system may also include a cache propagator application, and the listener application may send the metadata to the cache propagator application. The cache propagator application may then use the metadata to fetch the updated data from the database and refresh the cache with the updated data. The listener application may monitor the log, and, if an update to the cache fails, the listener application may re-trigger the cache propagator application to fetch the updated data and refresh the cache. Additionally, or alternatively, the cache propagator application may receive application requests and fetch data from the cache to provide to the applications, which simplifies the programming of the applications and facilitates easier triaging when something in the system is not functioning properly. In some embodiments, the cache propagator application may enforce common cache rules for multiple components within the same application infrastructure, which may further simplify programming of the components. Additionally, or alternatively, when adding new components, the new components may directly use the cache propagator application for cache integration, thereby eliminating the need for separate cache logic to be written into the new components.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

Figure 1:
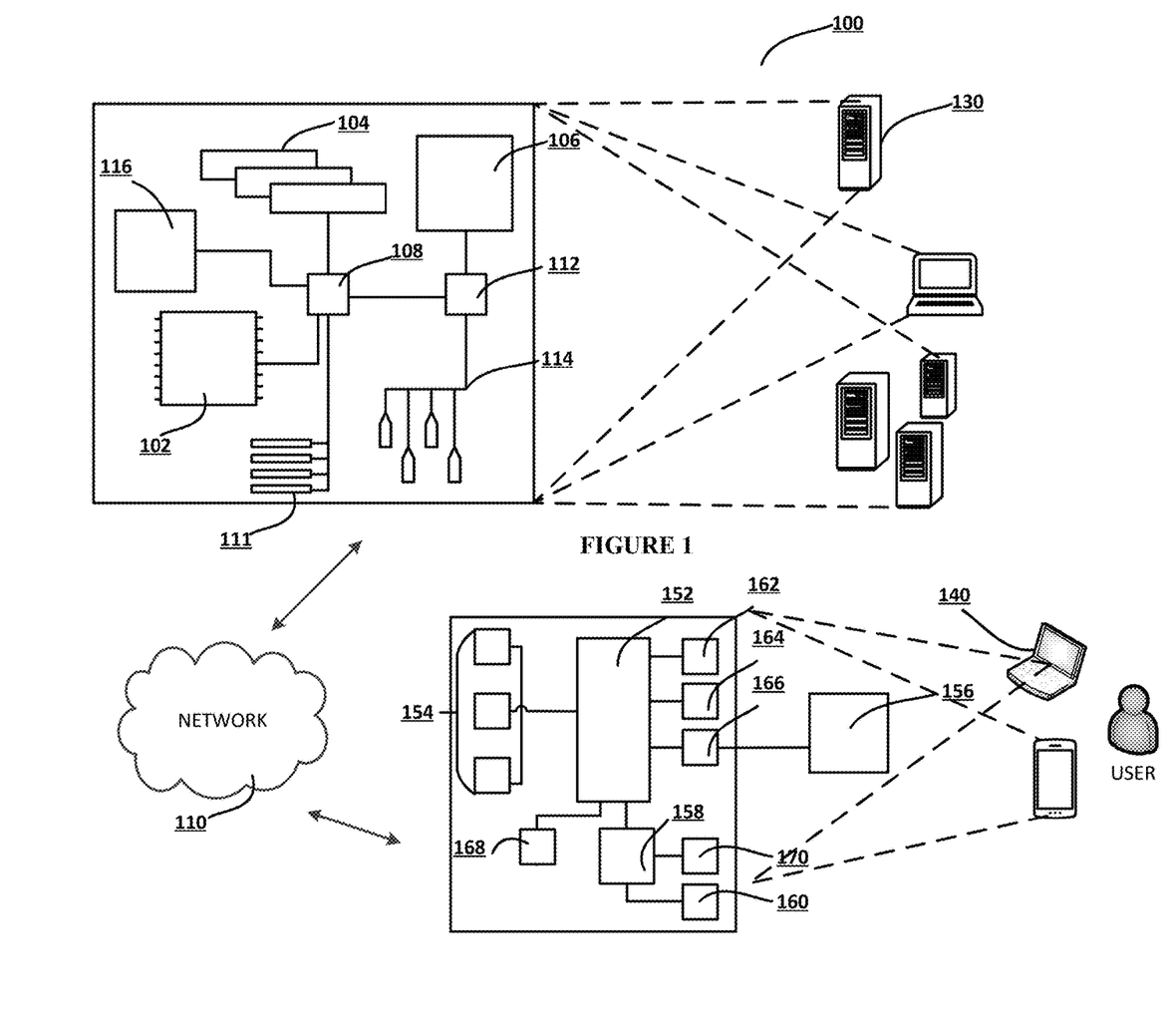
FIG. 1 illustrates technical components of a system for dynamically propagating data from a database to a cache, in accordance with an embodiment of the invention.

FIG. 1 presents an exemplary block diagram of a system environment 100 for dynamically propagating data from a database to a cache within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically propagating data from a database to a cache, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more cache management systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate a change and/or a modification to one or more of the systems, applications, services, and/or the like (e.g., similar to the system 130, running a system similar to the system 130, and/or the like). In some embodiments, the user input system and/or the cache management systems associated with the entity may perform one or more of the steps described herein with respect to the process flows described herein with respect to FIGS. 2-5.

Figure 2:
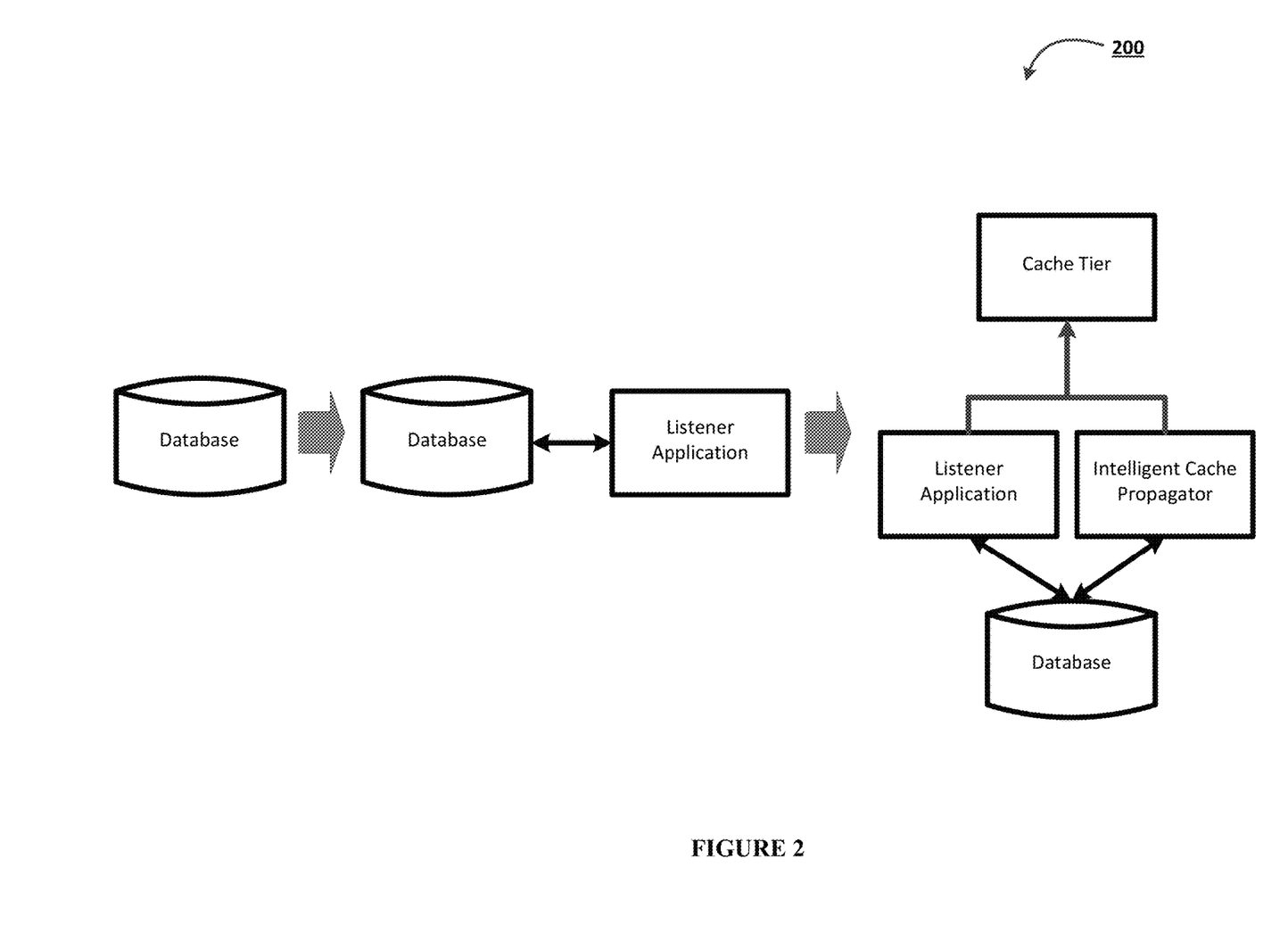
FIG. 2 illustrates a process flow for dynamically propagating data from a database to a cache, in accordance with an embodiment of the invention.

FIG. 2 illustrates a process flow 200 for dynamically propagating data from a database to a cache within a technical environment, in accordance with an embodiment of the invention. In some embodiments, a cache management system and/or the like (e.g., similar to one or more of the systems described herein with respect to FIG. 1) may perform one or more of the steps of process flow 200.

As shown in FIG. 2, the process flow 200 may include a database, a listener application, an intelligent cache propagator, and a cache tier. The process flow 200 may include receiving, at the databases, regular updates (e.g., planned and/or unplanned database updates) for creation, updating, inserting, and/or the like data records. In some embodiments, the process flow 200 may include sensing, with event handlers on the database, the database updates and, as shown in FIG. 2, sending metadata of the updates (e.g., action, content id, content type, and/or the like) to the listener application (e.g. via representational state transfer (REST) calls). Additionally, or alternatively, the process flow 200 may include, receiving, with the listener application, the metadata of the updates (e.g., changed records) and processing, with the listener application, the metadata of the updates.

In some embodiments, the process flow 200 may include sending, with the listener application, updates to the cache propagator application for updating the cache tier. Additionally, or alternatively, the process flow 200 may include maintaining, with the listener application, a record of failed transactions (e.g., a log). In some embodiments, the process flow 200 may include regularly and/or repeatedly processing, with the listener application, the metadata of the failed transactions to send the failed transactions to the cache propagator application until all of the updates are successfully propagated to the cache propagator application.

In some embodiments, for an in-memory cache, the process flow 200 may include reading, with the cache propagator application (e.g., which may be pluggable for all types of caching requirements), the metadata of the updates and updating, with the cache propagator application, the cache tier (e.g., a virtual machine cache tier) by fetching, with the cache propagator application, the updated data from the database and providing the updated data to the cache tier. Additionally, or alternatively, for a distributed cache, the process flow 200 may include reading, with the cache propagator application (e.g., which may be pluggable for all types of caching requirements), the metadata of the updates and updating, with the cache propagator application, the cache tiers for all application components by fetching, with the cache propagator application, the updated data from the database and providing the updated data to the cache tiers.

In this way, the process flow 200 may update real time data in respective cache tiers. In some embodiments, the cache propagator application may be mapped to a virtual machine to handle in-memory cache and may also propagate changes to a distributed cache tier if separately deployed and used for all application components together. Additionally, or alternatively, the process flow 200 may include using both pluggable applications, the listener application and the cache propagator application, to update a cache in real time for both in-memory caches and distributed caches.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

Figure 3:
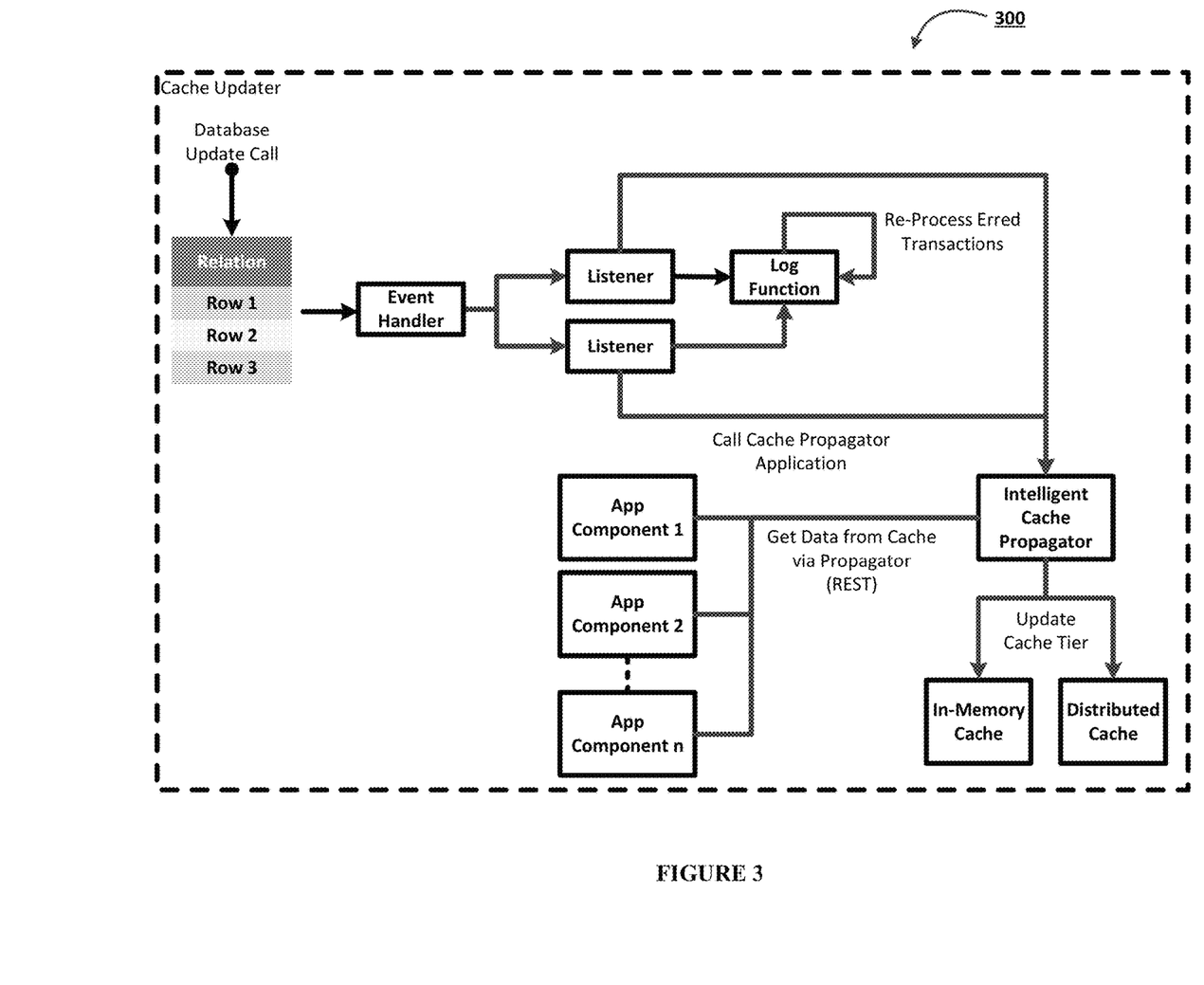
FIG. 3 illustrates a process flow for dynamically propagating data from a database to a cache, in accordance with an embodiment of the invention.

FIG. 3 illustrates a process flow 300 for dynamically propagating data from a database to a cache, in accordance with an embodiment of the invention. In some embodiments, a cache management system and/or the like (e.g., similar to one or more of the systems described herein with respect to FIG. 1) may perform one or more of the steps of process flow 300. As shown in FIG. 3, the process flow 300 may include a cache updater, an event handler, listener application components, a log function, an intelligent cache propagator, n application components, an in-memory cache, and a distributed cache. In some embodiments, the intelligent cache propagator may be setup on application server virtual machines of the n application components. Additionally, or alternatively, the letter "n" with respect to the application components indicates that the process flow 300 may include operating with respect to any number of application components.

As shown in FIG. 3, the process flow 300 may include receiving a database update call, for example, to update one or more entries and/or data records in a database. The process flow 300 may include sensing, with the event handler, the update to the database and sending, with the event handler, metadata associated with the update to the listener application components.

As shown in FIG. 3, the process flow 300 may include calling, with one of the listener application components and based on the metadata, the intelligent cache propagator. For example, the process flow 300 may include sending the metadata to the intelligent cache propagator. In some embodiments, and as shown in FIG. 3, the process flow 300 may include obtaining, with the intelligent cache propagator, the updated entries and/or data records from the database and updating, with the intelligent cache propagator, the cache tiers. For example, the intelligent cache propagator may push the updated entries and/or data records to the cache tiers by dynamic business rules.

As shown in FIG. 3, the process flow 300 may include providing, with the other listener application component, the metadata to the log function and generating, with the log function, a log of transactions. In some embodiments, the process flow 300 may include analyzing, with the other listener application component, the log of transactions to identify erred transactions and re-processing, with the other listener application component, the erred transactions. For example, the listener application component may re-send, based on identifying an erred transaction, the metadata to the intelligent cache propagator to trigger the intelligent cache propagator to obtain the updated entries and/or data records from the database and push the updated entries and/or data records to the cache tiers.

As also shown in FIG. 3, the process flow 300 may include receiving, with the intelligent cache propagator, requests for data from the cache tiers from the n application components. In some embodiments, the process flow 300 may include obtaining, with the intelligent cache propagator, the requested data from the cache tiers and providing, with the intelligent cache propagator, the requested data to the n application components.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

Figure 4:
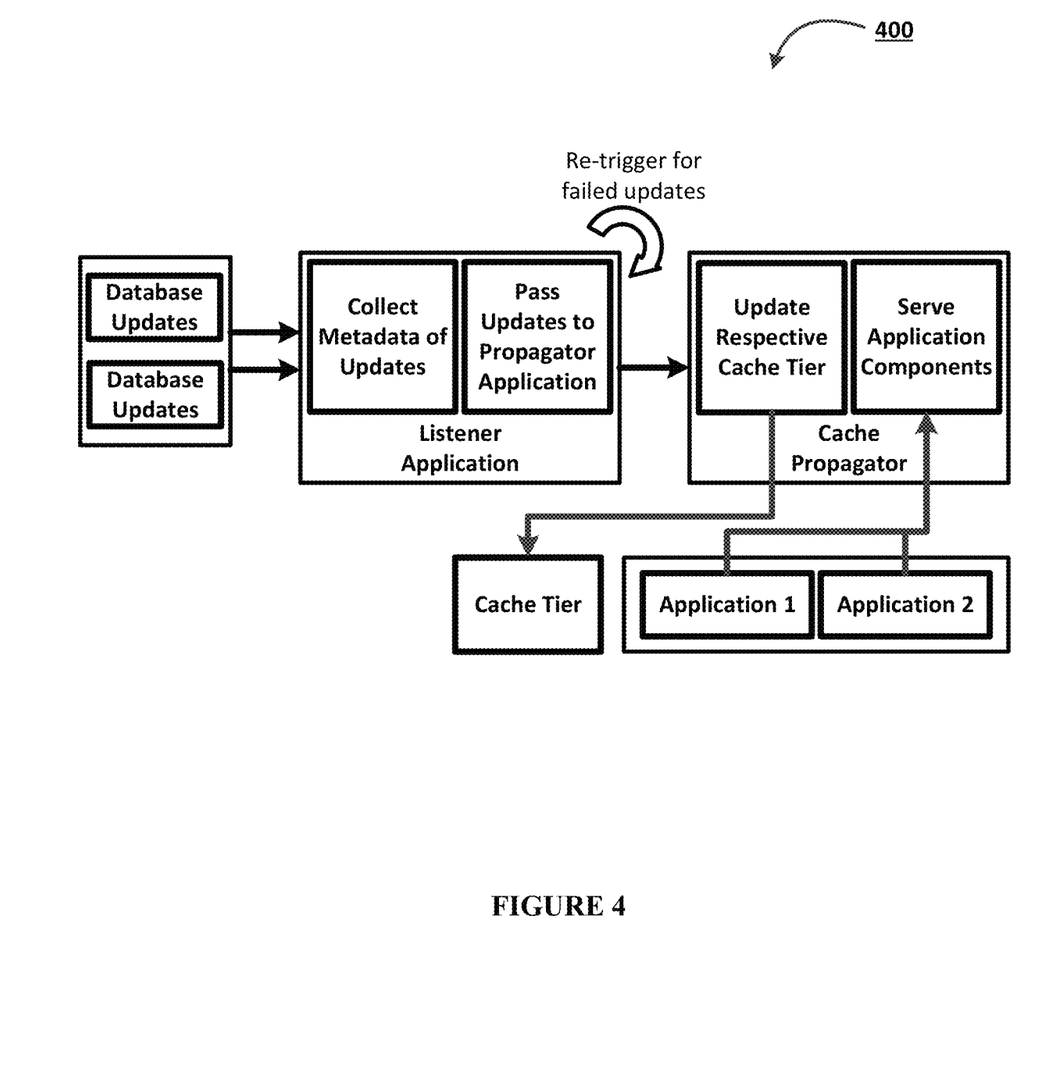
FIG. 4 illustrates a process flow for dynamically propagating data from a database to a cache, in accordance with an embodiment of the invention.

FIG. 4 illustrates a process flow 400 for dynamically propagating data from a database to a cache, in accordance with an embodiment of the invention. In some embodiments, a cache management system and/or the like (e.g., similar to one or more of the systems described herein with respect to FIG. 1) may perform one or more of the steps of process flow 400. As shown in FIG. 4, the process flow 400 may include database updates, a listener application, a cache propagator, a cache tier, application 1, and application 2. In some embodiments, the database updates may include multiple updates to the same database, updates to different databases, and/or the like. Additionally, or alternatively, although FIG. 4 depicts two applications, Application 1 and Application 2, the process flow 400 may include fewer applications (e.g., only one application) and/or more than two applications (e.g., any number of applications).

As shown in FIG. 4, the process flow 400 may include receiving, with the listener application, the database updates (e.g., at the same time). In some embodiments, each table and/or row update of a database may be considered as a separate transaction. Additionally, or alternatively, the process flow 400 may include propagating each update to the cache tier to be read by the applications (e.g., application 1, application 2, and/or the like) and avoid stale data. For example, the process flow 400 may ensure that every read from the cache tier is the latest data from the database.

As shown in FIG. 4, the process flow 400 may include, with the listener application, collecting metadata of the updates, processing the metadata (e.g., serially), and calling, based on the metadata, the cache propagator for each update. In some embodiments, and as shown in FIG. 4, the process flow 400 may include, with the listener application, tracking each transaction until each transaction has been properly updated in a respective cache tier by re-triggering the transaction for failed updates to the cache tier. For example, the listener application may re-trigger the transaction for a failed update by calling the cache propagator with the metadata from the failed update.

As shown in FIG. 4, the process flow 400 may include, with the cache propagator, fetching the updated data from the databases and updating the respective cache tier(s). In some embodiments, the cache propagator may be associated to multiple applications using different cache tiers (e.g., in-memory cache, distributed cache, and/or the like). Additionally, or alternatively, the cache propagator may include a pluggable application with configurations associated to various types of caches.

As shown in FIG. 4, the process flow 400 may include serving, with the cache propagator, the applications and/or application components to fetch data from the cache tiers. In some embodiments, the cache propagator may include a generic structure to connect to cache tier(s) and fetch content for calls from the applications and/or application components.

Process flow 400 may include additional embodiments, such as any single embodiment or any combination of embodiments described below and/or in connection with one or more other processes described elsewhere herein. Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

Figure 5:
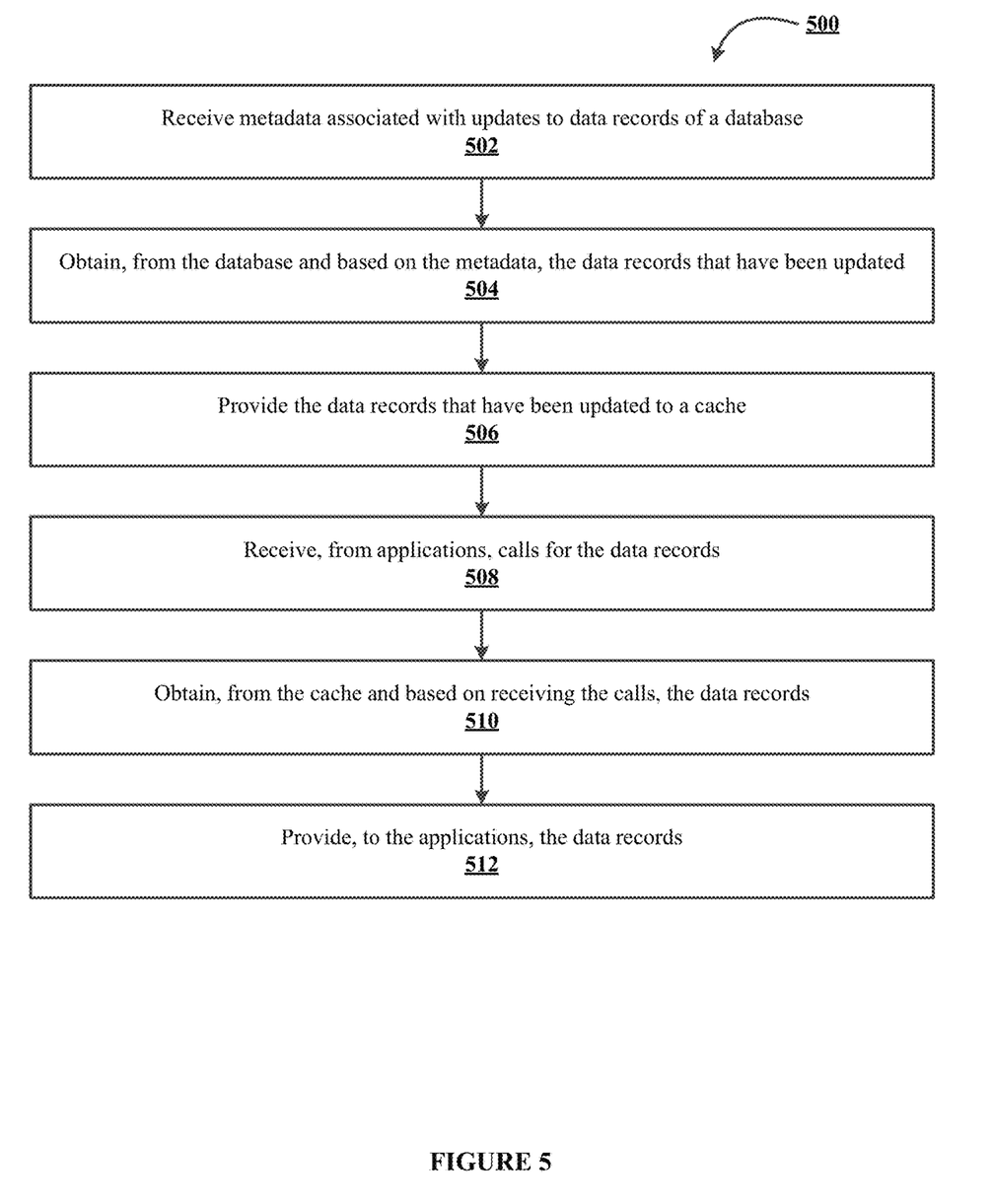
FIG. 5 illustrates a process flow for dynamically propagating data from a database to a cache, in accordance with an embodiment of the invention.

FIG. 5 illustrates a process flow 500 for dynamically propagating data from a database to a cache, in accordance with an embodiment of the invention. In some embodiments, a cache management system and/or the like (e.g., similar to one or more of the systems described herein with respect to FIG. 1) may perform one or more of the steps of process flow 500.

As shown in block 502, the process flow 500 may include receiving metadata associated with updates to data records of a database. For example, a cache management system may receive metadata associated with updates to data records of a database.

As shown in block 504, the process flow 500 may include obtaining, from the database and based on the metadata, the data records that have been updated. For example, a cache management system may obtain, from the database and based on the metadata, the data records that have been updated.

As shown in block 506, the process flow 500 may include providing the data records that have been updated to a cache. For example, a cache management system may provide the data records that have been updated to a cache.

As shown in block 508, the process flow 500 may include receiving, from applications, calls for the data records. For example, a cache management system may receive, from applications, calls for the data records.

As shown in block 510, the process flow 500 may include obtaining, from the cache and based on receiving the calls, the data records. For example, a cache management system may obtain, from the cache and based on receiving the calls, the data records.

As shown in block 512, the process flow 500 may include providing, to the applications, the data records. For example, a cache management system may provide, to the applications, the data records.

Process flow 500 may include additional embodiments, such as any single embodiment or any combination of embodiments described below and/or in connection with one or more other processes described elsewhere herein.

In a first embodiment, the process flow 500 may include monitoring the database and generating the metadata associated with the updates to the data records.

In a second embodiment alone or in combination with the first embodiment, the process flow 500 may include generating, based on the metadata, a log including the updates to the data records and transactions of the data records from the database to the cache, monitoring the log to identify, from the transactions, failed transactions, obtaining, from the database, based on the metadata, and based on identifying the failed transactions, data records associated with the failed transactions, and providing the data records associated with the failed transactions to the cache.

In a third embodiment alone or in combination with any of the first through second embodiments, the process flow 300 may include determining, based on the metadata, a cache architecture and, when providing the data records that have been updated to the cache, providing the data records that have been updated to the cache based on the cache architecture.

In a fourth embodiment alone or in combination with any of the first through third embodiments, the cache may include a plurality of caches, and the process flow 300 may include determining, based on the metadata, a cache architecture for storing the data records in the plurality of caches and providing, based on the cache architecture, the data records to the plurality of caches.

In a fifth embodiment alone or in combination with any of the first through fourth embodiments, the database may include a plurality of databases, the cache may include a plurality of caches, and the process flow 500 may include determining, based on the metadata, a cache architecture for storing the data records in the plurality of caches and providing, based on the cache architecture, the data records to the plurality of caches.

In a sixth embodiment alone or in combination with any of the first through fifth embodiments, the process flow 500 may include maintaining the data records in the cache until receiving other metadata associated with other updates to the data records.

In a seventh embodiment alone or in combination with any of the first through sixth embodiments, the process flow 500 may include receiving additional metadata associated with other updates to the data records, obtaining, from the database and based on the additional metadata, the data records that have been further updated, deleting the data records that have been updated from the cache, and providing the data records that have been further updated to the cache.

In an eighth embodiment alone or in combination with any of the first through seventh embodiments, the metadata includes, for each data record of the data records that have been updated, an indication of an action taken with respect to the data record, a content identifier of the data record, and/or a type of content of the data record.

In a ninth embodiment alone or in combination with any of the first through eighth embodiments, the cache includes an in-memory cache, a distributed cache, and/or the like.

In a tenth embodiment alone or in combination with any of the first through ninth embodiments, the process flow 500 may include obtaining the data records that have been updated and providing the data records that have been updated to the cache in real-time based on receiving the metadata.

In an eleventh embodiment alone or in combination with any of the first through tenth embodiments, the process flow 500 may include receiving calls for the data records from a plurality of types of applications and provide the data records to the plurality of types of applications.

Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically propagating data from a database to a cache, the system comprising:
    an event handler;
    a first listener application component;
    a second listener application component;
    a log function;
    a cache propagator application;
    at least one non-transitory storage device comprising computer-executable program code; and
    at least one processing device coupled to the at least one non-transitory storage device, the event handler, the first listener application component, the second listener application component, the log function, and the cache propagator application, wherein the at least one processing device is configured to execute the computer-executable program code to:
        sense, with the event handler, an update to a database;
        send, with the event handler and in response to sensing the update, metadata associated with the update to the first listener application component and the second listener application component;
        receive, with the first listener application component and the second listener application component, the metadata associated with the update;
        send, with the first listener application component in response to receiving the metadata, the metadata to the log function;
        generate, with the log function, a log of transactions;
        analyze, with the first listener application component, the log of transactions to identify erred transactions;
        re-send, with the first listener application component and in response to identifying the erred transaction, the metadata to the cache propagator application;
        send, with the second listener application component in response to receiving the metadata, the metadata to the cache propagator application;
        receive, with the cache propagator application and from either the first listener application component or the second listener application component, the metadata;
        obtain, with the cache propagator application, in response to receiving the metadata, from the database, and based on the metadata, data records that have been updated;
        provide, with the cache propagator application, the data records that have been updated to a cache;
        receive, with the cache propagator application and from applications, calls for the data records;
        obtain, with the cache propagator application, from the cache, and in response to receiving the calls for the data records, the data records; and
        provide, with the cache propagator application and to the applications, the data records from the cache.

2. The system of claim 1, wherein the at least one processing device is configured to execute the computer-executable program code to monitor, with the event handler, the database and generate additional metadata associated with updates to the data records.

3. The system of claim 1, wherein the at least one processing device is configured to execute the computer-executable program code to:
    determine, based on the metadata, a cache architecture; and
    when providing the data records that have been updated to the cache, provide, with the cache propagator application, the data records that have been updated to the cache based on the cache architecture.

4. The system of claim 1, wherein the cache comprises a plurality of caches, and wherein the at least one processing device is configured to execute the computer-executable program code to:
    determine, based on the metadata, a cache architecture for storing the data records in the plurality of caches; and
    provide, with the cache propagator application and based on the cache architecture, the data records to the plurality of caches.

5. The system of claim 1, wherein the database comprises a plurality of databases, wherein the cache comprises a plurality of caches, and wherein the at least one processing device is configured to execute the computer-executable program code to:
    determine, based on the metadata, a cache architecture for storing the data records in the plurality of caches; and
    provide, with the cache propagator application and based on the cache architecture, the data records to the plurality of caches.

6. The system of claim 1, wherein the at least one processing device is configured to execute the computer-executable program code to maintain the data records in the cache until sensing, with the event handler, other updates to the data records.

7. The system of claim 1, wherein the at least one processing device is configured to execute the computer-executable program code to:
    sense, with the event handler, other updates to the data records;
    send, with the event handler and in response to sensing the other updates, additional metadata associated with the other updates to the first listener application component and the second listener application component;
    receive, with the first listener application component and the second listener application component, the additional metadata associated with the other updates;
    receive, with the first listener application component and the second listener application component, the additional metadata associated with other updates to the data records;
    send, with the first listener application component in response to receiving the additional metadata, the additional metadata to the log function;

send, with the second listener application component in response to receiving the additional metadata, the additional metadata to the cache propagator application;
receive, with the cache propagator application and from either the first listener application component or the second listener application component, the additional metadata;
obtain, with the cache propagator application, in response to receiving the metadata, from the database, and based on the additional metadata, data records that have been further updated;
delete, with the cache propagator application, the data records that have been updated from the cache; and
provide, withe the cache propagator application, the data records that have been further updated to the cache.

8. The system of claim 1, wherein the metadata comprises, for each data record of the data records that have been updated, an indication of an action taken with respect to the data record, a content identifier of the data record, and a type of content of the data record.

9. The system of claim 1, wherein the cache comprises at least one of an in-memory cache or a distributed cache.

10. The system of claim 1, wherein the at least one processing device is configured to execute the computer-executable program code to obtain, with the cache propagator application, the data records that have been updated and provide, withe the cache propagator application, the data records that have been updated to the cache in real-time based on receiving the metadata.

11. The system of claim 1, wherein the at least one processing device is configured to execute the computer-executable program code to receive, with the cache propagator application, calls for the data records from a plurality of types of applications and provide, with the cache propagator application, the data records to the plurality of types of applications.

12. A computer program product for dynamically propagating data from a database to a cache, the computer program product comprising a non-transitory computer-readable medium comprising code causing a first apparatus to:
sense, with an event handler of the first apparatus, an update to a database;
send, with the event handler and in response to sensing the update, metadata associated with the update to a first listener application component of the first apparatus and a second listener application component of the first apparatus;
receive, with the first listener application component and the second listener application component, the metadata associated with the update;
send, with the first listener application component in response to receiving the metadata, the metadata to a log function of the first apparatus;
generate, with the log function, a log of transactions;
analyze, with the first listener application component, the log of transactions to identify erred transactions;
re-send, with the first listener application component and in response to identifying the erred transaction, the metadata to a cache propagator application of the first apparatus;
send, with the second listener application component in response to receiving the metadata, the metadata to the cache propagator application;
receive, with the cache propagator application and from either the first listener application component or the second listener application component, the metadata;
obtain, with the cache propagator application, in response to receiving the metadata, from the database, and based on the metadata, data records that have been updated;
provide, with the cache propagator application, the data records that have been updated to a cache;
receive, with the cache propagator application and from applications, calls for the data records;
obtain, with the cache propagator application, from the cache, and in response to receiving the calls for the data records, the data records; and
provide, with the cache propagator application and to the applications, the data records from the cache.

13. The computer program product of claim 12, wherein the non-transitory computer-readable medium comprises code causing the first apparatus to monitor, with the event handler, the database and generate additional metadata associated with updates to the data records.

14. The computer program product of claim 12, wherein the non-transitory computer-readable medium comprises code causing the first apparatus to:
determine, based on the metadata, a cache architecture; and
when providing the data records that have been updated to the cache, provide, with the cache propagator application, the data records that have been updated to the cache based on the cache architecture.

15. The computer program product of claim 12, wherein the cache comprises a plurality of caches, and wherein the non-transitory computer-readable medium comprises code causing the first apparatus to:
determine, based on the metadata, a cache architecture for storing the data records in the plurality of caches; and
provide, with the cache propagator application and based on the cache architecture, the data records to the plurality of caches.

16. The computer program product of claim 12, wherein the database comprises a plurality of databases, wherein the cache comprises a plurality of caches, and wherein the non-transitory computer-readable medium comprises code causing the first apparatus to:
determine, based on the metadata, a cache architecture for storing the data records in the plurality of caches; and
provide, with the cache propagator application and based on the cache architecture, the data records to the plurality of caches.

17. The computer program product of claim 12, wherein the non-transitory computer-readable medium comprises code causing the first apparatus to maintain the data records in the cache until sensing, with the event handler, other updates to the data records.

18. A method for dynamically propagating data from a database to a cache, the method comprising:
sensing, with an event handler of a system, an update to a database;
sending, with the event handler and in response to sensing the update, metadata associated with the update to a first listener application component of the system and a second listener application component of the system;
receiving, with the first listener application component and the second listener application component, the metadata associated with the update;
sending, with the first listener application component in response to receiving the metadata, the metadata to a log function of the system;
generating, with the log function, a log of transactions;
analyzing, with the first listener application component, the log of transactions to identify erred transactions;

re-sending, with the first listener application component and in response to identifying the erred transaction, the metadata to a cache propagator application of the system;

sending, with the second listener application component in response to receiving the metadata, the metadata to the cache propagator application;

receiving, with the cache propagator application and from either the first listener application component or the second listener application component, the metadata;

obtaining, with the cache propagator application, in response to receiving the metadata, from the database, and based on the metadata, data records that have been updated;

providing, with the cache propagator application, the data records that have been updated to a cache;

receiving, with the cache propagator application and from applications, calls for the data records;

obtaining, with the cache propagator application, from the cache, and in response to receiving the calls for the data records, the data records; and providing, with the cache propagator application and to the applications, the data records from the cache.

19. The method of claim 18, comprising monitoring, with the event handler, the database and generating additional metadata associated with updates to the data records.

20. The method of claim 18, comprising:

determining, based on the metadata, a cache architecture; and when providing the data records that have been updated to the cache, providing, with the cache propagator application, the data records that have been updated to the cache based on the cache architecture.

\* \* \* \* \*